(12) United States Patent
Ogawa et al.

(10) Patent No.: US 11,059,672 B2
(45) Date of Patent: Jul. 13, 2021

(54) ARTICLE TRANSPORT FACILITY

(71) Applicant: Daifuku Co., Ltd., Osaka (JP)

(72) Inventors: Yuso Ogawa, Hinocho (JP); Natsuo Takagawa, Hinocho (JP); Kazuharu Yoshinaga, Hinocho (JP); Toshikazu Kato, Hinocho (JP); Yusuke Morimoto, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 397 days.

(21) Appl. No.: 16/117,366

(22) Filed: Aug. 30, 2018

(65) Prior Publication Data

US 2019/0062064 A1 Feb. 28, 2019

(30) Foreign Application Priority Data

Aug. 31, 2017 (JP) .............................. JP2017-167554

(51) Int. Cl.
*B65G 35/06* (2006.01)
*B65G 1/04* (2006.01)
(Continued)

(52) U.S. Cl.
CPC ................ *B65G 35/06* (2013.01); *A62C 2/22* (2013.01); *A62C 2/24* (2013.01); *A62C 3/14* (2013.01); *B65G 1/04* (2013.01); *B65H 7/06* (2013.01); *G08B 17/113* (2013.01); *A62C 3/002* (2013.01); *B65G 2207/22* (2013.01); *E05Y 2900/134* (2013.01)

(58) Field of Classification Search
CPC ...... B65G 35/06; B65G 1/04; B65G 2207/22; B65H 7/06; A62C 2/22; A62C 2/24; A62C 3/14; G08B 17/113; G08B 17/002; E05Y 2900/134
See application file for complete search history.

(56) References Cited

U.S. PATENT DOCUMENTS

| 380,690 A | * | 4/1888 | Peirce ............................. 49/362 |
| 1,480,453 A | * | 1/1924 | Lane ....................... E05D 13/06 |
| | | | 49/119 |

(Continued)

FOREIGN PATENT DOCUMENTS

| EP | 0022464 A1 | 1/1981 |
| JP | 60144809 A | 7/1985 |

(Continued)

*Primary Examiner* — Saul Rodriguez
*Assistant Examiner* — Ashley K Romano
(74) *Attorney, Agent, or Firm* — The Webb Law Firm (57) ABSTRACT

A fire protection door in an open position is present above a traveling path of a transport vehicle. The fire protection door is capable of moving downward from the open position to a closed position along a door trajectory. The transport vehicle includes: a control portion; an area detection portion that detects an interference area, which is an area in which a portion of the transport vehicle in the traveling path overlaps the door trajectory; and a descent detection portion that detects a descent of the fire protection door. The control portion performs a retraction control such that the transport vehicle travels to the outside of the interference area when the descent detection portion has detected a descent of the fire protection door in a state in which the transport vehicle is located in the interference area.

16 Claims, 4 Drawing Sheets

(51) Int. Cl.
*G08B 17/113* (2006.01)
*B65H 7/06* (2006.01)
*A62C 2/22* (2006.01)
*A62C 2/24* (2006.01)
*A62C 3/00* (2006.01)
*A62C 2/06* (2006.01)

(56) References Cited

U.S. PATENT DOCUMENTS

| | | | | |
|---|---|---|---|---|
| 3,224,382 A * | 12/1965 | Floehr | | B61D 7/22 |
| | | | | 105/282.2 |
| 4,457,106 A * | 7/1984 | Forquer | | E06B 9/04 |
| | | | | 160/197 |
| 5,893,242 A * | 4/1999 | Perron | | E05F 11/36 |
| | | | | 52/202 |
| 6,021,608 A * | 2/2000 | Ollison | | E05B 65/08 |
| | | | | 292/67 |
| 6,658,793 B2 * | 12/2003 | Perron | | E05F 11/04 |
| | | | | 49/123 |
| 7,610,718 B2 * | 11/2009 | Kopish | | E05F 5/003 |
| | | | | 49/211 |
| 2002/0032991 A1 * | 3/2002 | James, Jr. | | A62C 2/22 |
| | | | | 52/30 |
| 2003/0042114 A1 | 3/2003 | Iizuka | | |
| 2006/0048466 A1 * | 3/2006 | Darnell | | E06B 1/60 |
| | | | | 52/204.1 |
| 2008/0092330 A1 * | 4/2008 | Haab | | E05F 5/003 |
| | | | | 16/98 |
| 2011/0132698 A1 * | 6/2011 | Yu | | E05D 15/063 |
| | | | | 187/333 |
| 2013/0227891 A1 * | 9/2013 | Cox | | E06B 5/167 |
| | | | | 49/394 |
| 2016/0214831 A1 * | 7/2016 | Yoshioka | | A62C 2/00 |
| 2016/0340966 A1 * | 11/2016 | Hosaka | | E06B 5/167 |
| 2017/0002523 A1 * | 1/2017 | Ogisu | | B61B 3/02 |
| 2018/0347263 A1 * | 12/2018 | Kawabe | | E05D 15/0686 |
| 2019/0093290 A1 * | 3/2019 | Sasaki | | B61B 5/02 |
| 2019/0112131 A1 * | 4/2019 | Hosaka | | B65G 35/06 |
| 2019/0264484 A1 * | 8/2019 | Tuminella | | E05D 15/0686 |
| 2019/0292835 A1 * | 9/2019 | Soderqvist | | E05F 15/72 |
| 2019/0381342 A1 * | 12/2019 | Takagawa | | B65G 43/00 |
| 2020/0115953 A1 * | 4/2020 | Swartz | | E06B 5/167 |

FOREIGN PATENT DOCUMENTS

| | | |
|---|---|---|
| JP | 200379074 A | 3/2003 |
| JP | 2005225583 A | 8/2005 |
| JP | 201255103 A | 3/2012 |

* cited by examiner

Fig.4

ARTICLE TRANSPORT FACILITY

CROSS-REFERENCE TO RELATED APPLICATION

This application claims priority to Japanese Patent Application No. 2017-167554 filed Aug. 31, 2017, the disclosure of which is hereby incorporated in its entirety by reference.

BACKGROUND OF THE INVENTION

1. Field of the Invention

The present invention relates to an article transport facility including a transport vehicle that travels along a traveling path so as to transport an article.

2. Description of the Related Art

JP 2005-225583A discloses an article transport facility including a fire protection door (22) capable of moving downward from an open position to a closed position. Normally, the fire protection door (22) is in the open position. When a fire has occurred, the spreading of the fire can be prevented by allowing the fire protection door (22) to descend to the closed position. In a state in which the fire protection door (22) is in the open position, the transport vehicle can travel below the fire protection door (22) along a traveling path.

Here, if the transport vehicle is located in a movement path of the fire protection door (22) when moving the fire protection door (22) from the open position to the closed position on the occurrence of a fire, the fire protection door may come into contact with the transport vehicle, and thus may not descend to the closed position.

SUMMARY OF THE INVENTION

Therefore, there is a need for an article transport facility capable of appropriately allowing the fire protection door to descend to the closed position.

In view of the foregoing, an article transport facility according to one aspect includes a transport vehicle that travels along a traveling path so as to transport an article, wherein a fire protection door in an open position is present above the traveling path, the fire protection door is capable of moving downward to a closed position located below the open position, the transport vehicle includes: a driving portion that rotates a traveling wheel; a control portion that controls the driving portion; an area detection portion that detects an interference area, which is an area in which a portion of the transport vehicle in the traveling path overlaps a door trajectory, which is a movement trajectory of the fire protection door; and a descent detection portion that detects a descent of the fire protection door, and the control portion performs a retraction control to control the driving portion such that the transport vehicle travels to the outside of the interference area when the descent detection portion has detected a descent of the fire protection door in a state in which the transport vehicle is located in the interference area.

With this configuration, if the transport vehicle is located in the interference area when the descent detection portion has detected a descent of the fire protection door, the transport vehicle travels to the outside of the interference area by the control portion performing the retraction control. Accordingly, it is possible to prevent the fire protection door that has descended from the open position from interfering with the transport vehicle or an article placed on the transport vehicle. Thus, the present configuration can prevent the transport vehicle or an article placed on the transport vehicle from interfering with the fire protection door. Accordingly, it is possible to appropriately allow the fire protection door to descend to the closed position.

DETAILED DESCRIPTION OF PREFERRED EMBODIMENTS

Figure 1:
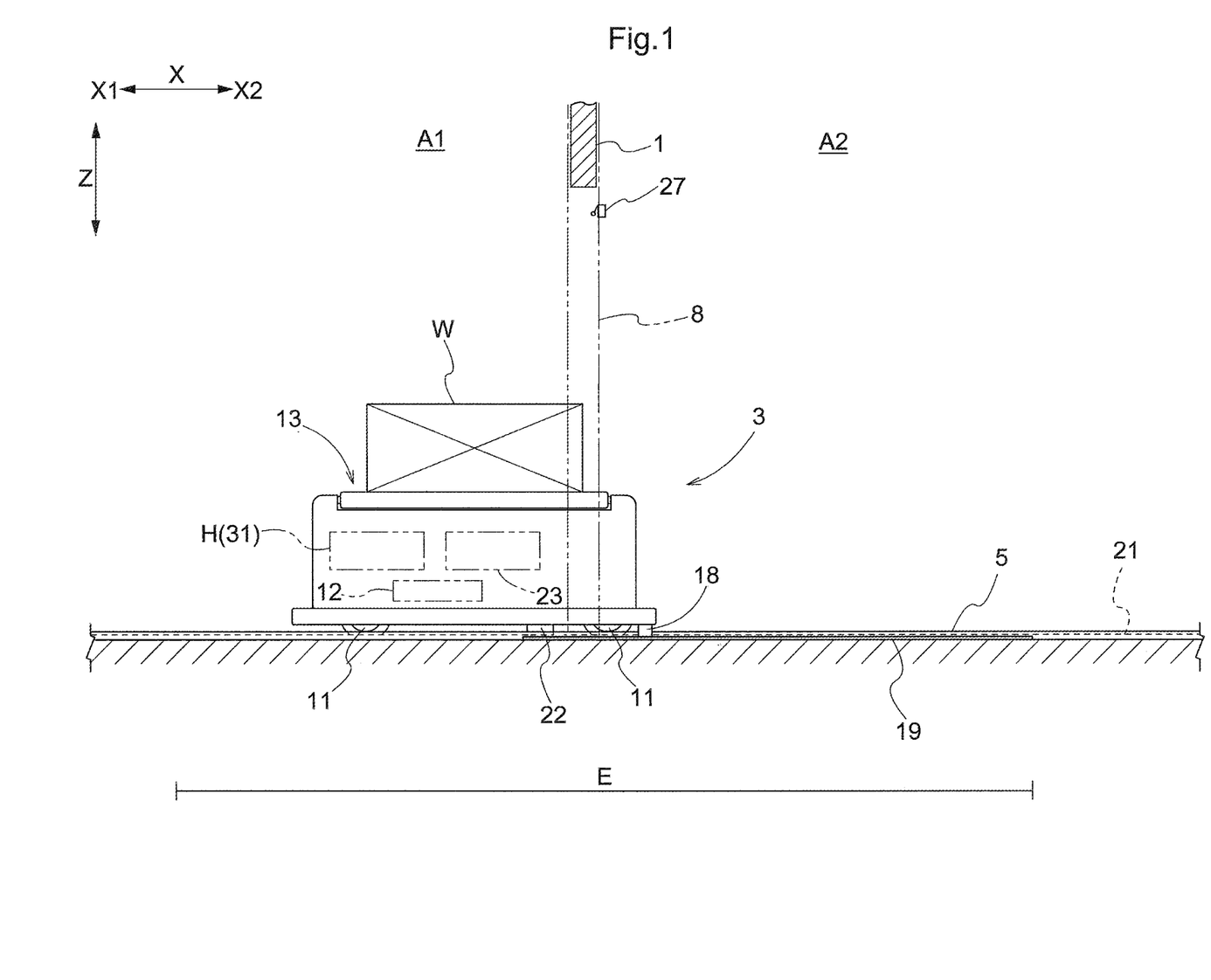
FIG. 1 is a side view of an article transport facility.
Figure 2:
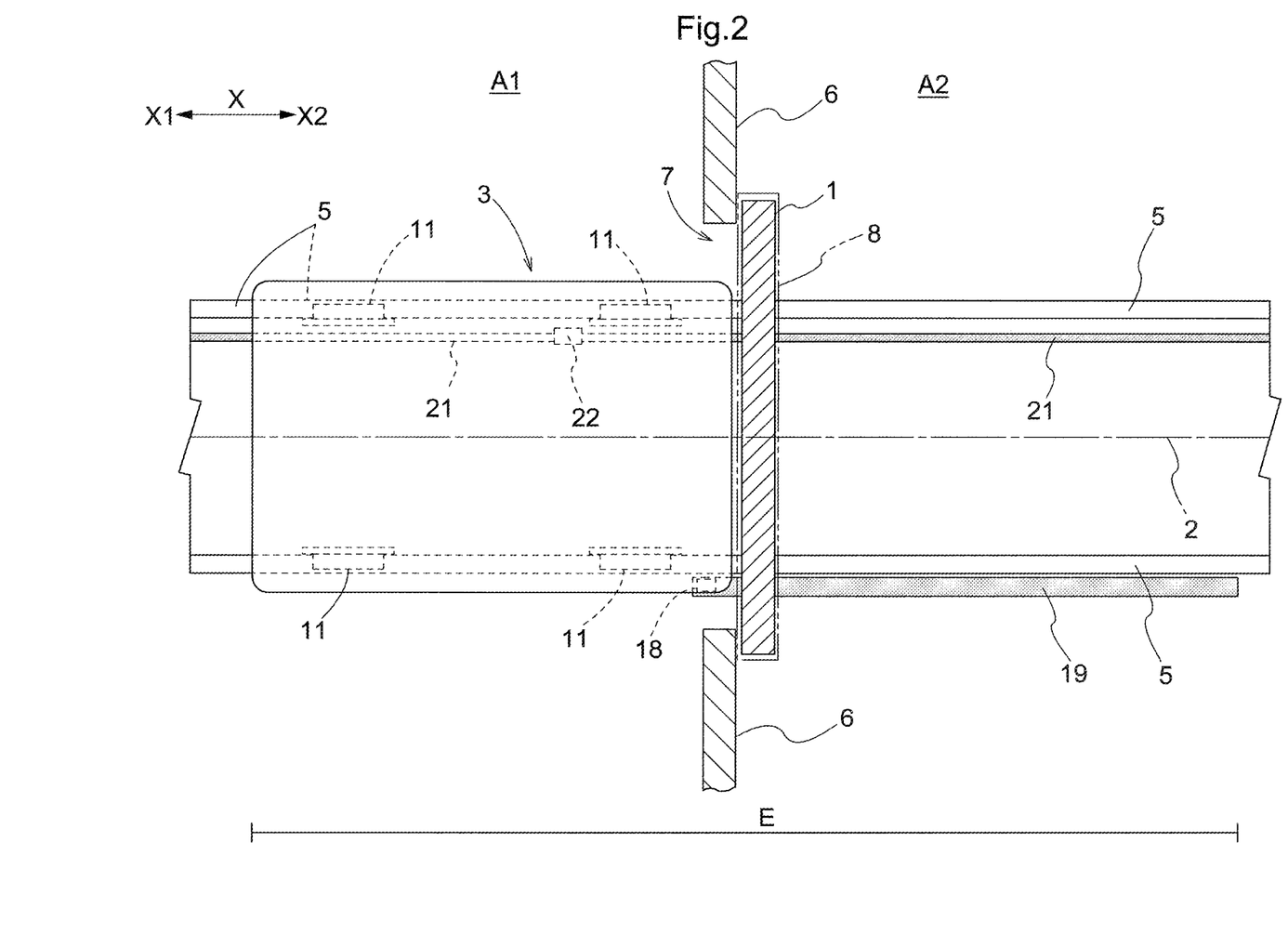
FIG. 2 is a plan view of the article transport facility.
Figure 4:
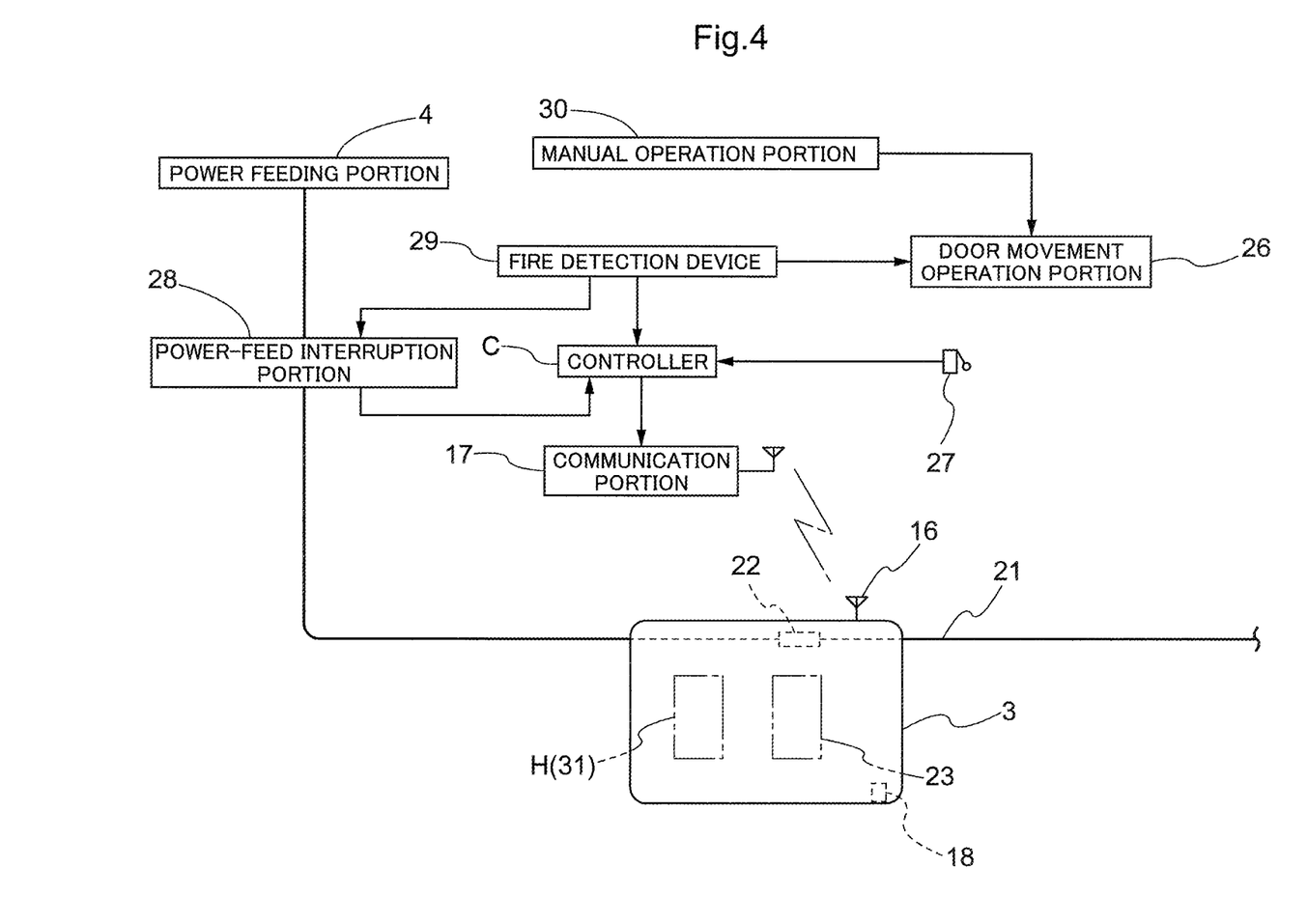
FIG. 4 is a control block diagram of the article transport facility.

An article transport facility will be described with reference to the drawings. As shown in FIGS. 1 and 2, the article transport facility includes a fire protection door 1 that opens and closes by moving in a vertical direction Z, and a transport vehicle 3 that travels along a traveling path 2 so as to transport an article W. As shown in FIG. 4, the article transport facility also includes a power feeding portion 4 that supplies driving power to the transport vehicle 3, and a controller C that controls the transport vehicle 3.

Figure 3:
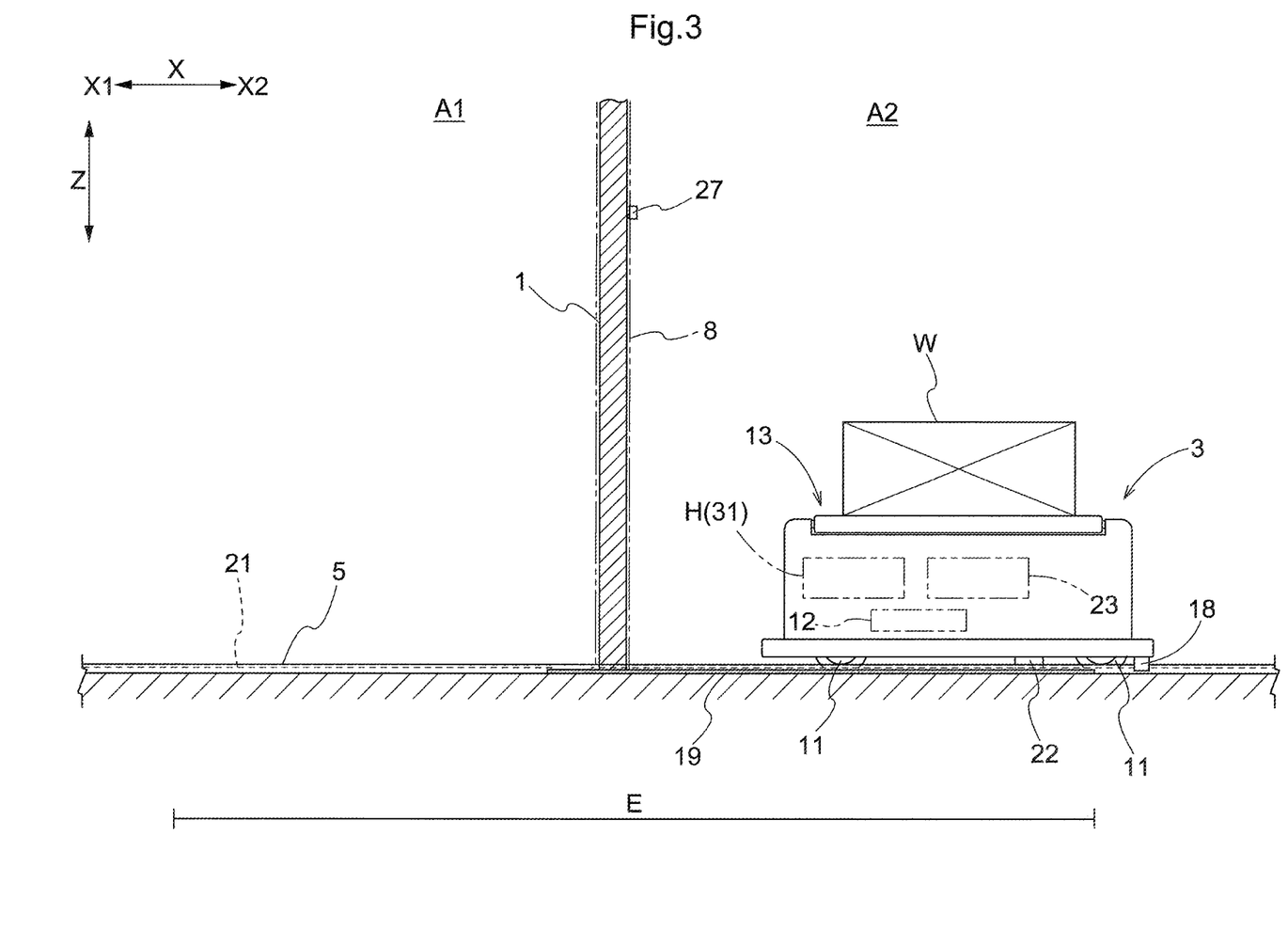
FIG. 3 is a side view of the article transport facility.

As shown in FIGS. 1 to 3, traveling rails 5 are installed on the floor surface of the article transport facility, along the traveling path 2. The traveling rails 5 are installed extending from a first area A1 to a second area A2 in a state in which the traveling rails 5 pass through an opening 7 of a wall member 6. As shown in FIG. 2, the first area A1 and the second area A2 are divided by the wall member 6, and the fire protection door 1 opens and closes the opening 7 formed in the wall member 6. The fire protection door 1 is capable of moving downward from an open position (the position shown in FIG. 1) to a closed position (the position shown in FIG. 3) located below the open position. The fire protection door 1, in the open position, opens the opening 7 of the wall member 6, and, in the closed position, closes the opening 7 of the wall member 6. The fire protection door 1 in the open position is present above the traveling path 2. In the present embodiment, a fire shutter is used as the fire protection door 1. As will be described later, the transport vehicle 3 includes a descent detection portion 31 that detects a downward movement of the fire protection door 1 from the open position.

As shown in FIGS. 1 and 3, the transport vehicle 3 includes a traveling wheels 11 that roll on the traveling rails 5, a traveling motor 12 serving as a driving portion that rotationally drives the traveling wheels 11, and a transport conveyor 13 that supports the article W and transports the article W. The transport vehicle 3 travels on the traveling rails 5 along the traveling path 2 by rotating the traveling wheels 11 by the driving of the traveling motor 12. The transport vehicle 3 can transfer the article W between the transport conveyor 13 and a transfer target location (not shown) by driving the transport conveyor 13 in a state in which the transport vehicle 3 is stopped adjacent to the transfer target location.

As shown in FIG. 4, the transport vehicle 3 includes a control portion H that controls the traveling motor 12 and the transport conveyor 13, and a communication portion (a first communication portion 16) that receives information transmitted from the controller C. The controller C transmits a various types of information from a communication portion (a second communication portion 17) to the transport vehicle 3, and the transport vehicle 3 receives the various types of information transmitted from the controller C by the first communication portion 16. Thus, the transport vehicle 3 is configured to be capable of exchanging various types of information with the controller C via wireless communication.

As shown in FIGS. 1 to 3, the transport vehicle 3 includes an area detection portion 18 that detects an interference area E, which will be described later. The interference area E is an area in which a portion of the transport vehicle 3 in the traveling path 2 overlaps a door trajectory 8, which is a movement trajectory of the fire protection door 1. An object to be detected 19 is installed along the traveling path 2 so as to correspond to the interference area E. The interference area E is set to be a range in which the area detection portion 18 detects the object to be detected 19 along the traveling path 2. The object to be detected 19 is installed so as to be detected by the area detection portion in a state in which the whole of the transport vehicle 3 is located in the interference area E, and a portion of the transport vehicle 3 overlaps the door trajectory 8.

The object to be detected 19 is installed along the traveling path 2 such that the object to be detected 19 is detected by the area detection portion 18 in a state in which the whole of the transport vehicle 3 has moved into the interference area E and a portion of the transport vehicle 3 overlaps the door trajectory 8, and that the object to be detected 19 is not detected by the area detection portion 18 in a state in which at least a portion of the transport vehicle 3 has moved out from the interference area E and the whole of the transport vehicle 3 does not overlap the door trajectory 8. That is, in a state in which the object to be detected 19 has been detected by the area detection portion 18, the whole of the transport vehicle 3 has moved into the interference area E, and a portion of the transport vehicle 3 overlaps the door trajectory 8.

As shown in FIGS. 1 to 4, the transport vehicle 3 includes a power receiving portion 22 to which power is supplied from a power feeding line 21 installed along the traveling path 2, and a power storage device 23 that is charged with the power supplied to the power receiving portion 22. The power feeding line 21 is connected to the power feeding portion 4 serving as a supply source of power. Power from the power feeding portion 4 is supplied to the power feeding line 21, and the transport vehicle 3 receives the power from the power feeding line 21 by the power receiving portion 22. Thus, driving power is supplied to the transport vehicle 3 from the power feeding portion 4.

In a state in which driving power from the power feeding portion 4 is supplied, the driving power from the power feeding portion 4 is supplied to the traveling motor 12 and the transport conveyor 13. In a state in which the supply of driving power from the power feeding portion 4 is interrupted, the power stored in the power storage device 23 is supplied as driving power to the traveling motor 12 and the transport conveyor 13.

The article transport facility includes a door movement operation portion 26 that moves the fire protection door 1 in the open position toward the closed position, a door detection portion 27 that detects the fire protection door 1 that has moved downward from the open position, a power-feed interruption portion 28 that interrupts the supply of power from the power feeding portion 4 to the power feeding line 21, a fire detection device 29 that detects a fire, and a manual operation portion 30 that is operated by an operator when moving the fire protection door 1 to the closed position.

The fire detection device 29 is constituted, for example, by a fire operation switch that is operated by the operator on occurrence of a fire, or a fire detection portion that detects heat or smoke caused by a fire. The fire detection device 29 transmits a notification signal to the door movement operation portion 26, the power power-feed interruption portion 28, and the controller C when a fire is not detected, and stops transmitting the notification signal when a fire has been detected as a result of the fire operation switch having been operated or the fire detection portion having detected heat or smoke. As will be described later, the descent detection portion 31 detects a descent of the fire protection door 1 based on a result of detection by the fire detection device 29. In the present embodiment, emergency stop information based on the notification signal is transmitted from the controller C to the control portion H that functions as the descent detection portion 31, and the control portion H (descent detection portion 31) detects a descent of the fire protection door 1 based on an abnormal stop signal.

The door movement operation portion 26 holds the fire protection door 1 so as to be in the open position, and releases the hold of the fire protection door 1 when the fire detection device 29 has detected a fire. That is, the door movement operation portion 26 releases the hold of the fire protection door 1 based on that the notification signal from the fire detection device 29 is stopped being input, and that an operation signal transmitted as the manual operation portion 30 is operated is input. The fire protection door 1 for which the hold by the door movement operation portion 26 has been released moves downward by its own weight from the open position to the closed position. Thus, the fire protection door 1 is configured to close when the fire detection device 29 has detected a fire, and when the manual operation portion 30 has been operated.

The door detection portion 27 is disposed below the open position and above the closed position, and detects the fire protection door 1. As will be described later, the descent detection portion 31 detects a descent of the fire protection door 1 based on a result of detection by the door detection portion 27. In the present embodiment, a limit switch is used as the door detection portion 27. The door detection portion 27 detects the fire protection door 1 that has moved downward from the open position, based on that the fire protection door 1 that has descended from the open position comes into contact with the door detection portion 27. When the door detection portion 27 has detected the fire protection door 1, door detection information is transmitted from the door detection portion 27 to the controller C. As will be described later, emergency stop information based on the door detection information is transmitted from the controller C to the control portion H that functions as the descent detection portion 31, and the control portion H (descent detection portion 31) detects a descent of the fire protection door 1 based on the abnormal stop signal.

The power-feed interruption portion 28 is provided in a power feeding path from the power feeding portion 4 to the power feeding line 21. The power-feed interruption portion 28 includes an operation switch that is operated by the operator when performing an emergency stop for the transport vehicle 3, and the supply of power from the power feeding portion 4 to the power feeding line 21 is interrupted as the operation switch is operated by the operator. The power-feed interruption portion 28 interrupts the supply of power from the power feeding portion 4 to the power feeding line 21 as the input of the notification signal is stopped. Then, as the fire detection device 29 detects a fire, the supply of power from the power feeding portion 4 to the power feeding line 21 is interrupted, and, furthermore, the supply of power of the transport vehicle 3 received from the power feeding line 21 is interrupted. When the supply of power from the power feeding portion 4 is interrupted by the power-feed interruption portion 28, an interruption signal is transmitted from the power-feed interruption portion 28 to the controller C.

The controller C transmits transport information to the transport vehicle 3 if none of the following conditions is satisfied: a door detection signal from the door detection portion 27 is input; a notification signal of the fire detection device 29 is stopped being input; and an interruption signal from the power-feed interruption portion 28 is input. The controller C transmits emergency stop information to the transport vehicle 3 if one of the following conditions is satisfied: the door detection signal is input from the door detection portion 27; the notification signal from the fire detection device 29 is stopped being input; and an interruption signal from the power-feed interruption portion 28 is input.

When the notification signal is stopped being input to the controller C as a result of a fire having been detected by the fire detection device 29, the fire protection door 1 is automatically closed, and also the emergency stop information is transmitted from the controller C to the transport vehicle 3. When the emergency stop information is transmitted from the controller C to the transport vehicle 3 in this manner, the door movement operation portion 26 releases the hold of the fire protection door 1 because the notification signal from the fire detection device 29 is stopped being input, and the fire protection door 1 moves downward from the open position. That is, the control portion H of the transport vehicle 3 can detect a downward movement of the fire protection door 1 from the open position based on the emergency stop information transmitted from the controller C. Therefore, the control portion H corresponds to the descent detection portion 31 that detects a downward movement of the fire protection door 1 from the open position.

That is, the article transport facility includes the controller C that transmits, to the transport vehicle 3, the emergency stop information for stopping the transport vehicle 3, and the control portion H of the transport vehicle 3 functions as the descent detection portion 31. The control portion H detects a descent of the fire protection door 1 based on the emergency stop information received from the controller C. As described above, the controller C transmits the emergency stop information, at least, when the door detection portion 27 has detected the fire protection door 1 (has detected that the fire protection door 1 has descended), and when the fire detection device 29 has detected a fire.

The control portion H performs a transport control when the transport information has been received. In the transport control, the control portion H controls the traveling motor 12 and the transport conveyor 13 so as to transport the article W based on the transport information. The control portion H performs a retraction control when the emergency stop information has been received. In the retraction control, the control portion H determines whether the transport vehicle 3 is located in the interference area E based on the detection information from the area detection portion 18. If the transport vehicle 3 is not located in the interference area E, the control portion H immediately stops the transport vehicle 3. If the transport vehicle 3 is located in the interference area E, the control portion H controls the traveling motor 12 such that the transport vehicle 3 stops after traveling to the outside of the interference area E.

The control portion H performs the retraction control either when a door detection signal from the door detection portion 27 is input to the controller, or when a notification signal from the fire detection device 29 is not input to the controller C, or when an interruption signal from the power-feed interruption portion 28 is input to the controller C. Therefore, the retraction control is performed in a situation where the supply of power from the power feeding portion 4 is interrupted, including, for example, a case where the fire protection door 1 moves downward from the open position as a result of a fire having been detected by the fire detection device 29. Accordingly, when the control portion H performs the retraction control, the traveling motor 12 is driven by the power supplied from the power storage device 23. Since the transport vehicle 3 travels to the outside of the interference area E as a result of the control portion H performing the retraction control, it is possible to prevent the transport vehicle 3 from stopping in a state in which it overlaps the door trajectory 8.

Next, other embodiments of the article transport facility will be described.

(1) In the above embodiment, the traveling rails 5 are installed along the traveling path 2, and the transport vehicle 3 travels on the traveling rails 5 along the traveling path 2, while being guided by the traveling rails 5. However, the configuration in which the transport vehicle 3 travels along the traveling path 2 may be changed as appropriate. Specifically, for example, guide rails may be installed along the traveling path 2, and the transport vehicle 3 may travel on the floor surface while guided portions of the transport vehicle 3 is guided by the guide rails. Alternatively, a magnetic tape may be placed along the traveling path 2, and the transport vehicle 3 may travel on the floor surface along the traveling path 2 in a state in which the transport vehicle 3 is guided by the magnetism of the magnetic tape.

(2) In the above embodiment, power is supplied to the power receiving portion 22 of the transport vehicle 3 from the power feeding line 21 installed along the traveling path 2. However, power may be supplied to the power receiving portion 22 of the transport vehicle 3 from a feeding device installed so as to correspond to a preset charging position in a state in which the transport vehicle 3 is stopped at the charging position.

(3) In the above embodiment, the control portion H performs the retraction control when the supply of power from the power feeding line 21 to the power receiving portion 22 is stopped, in addition to when the descent detection portion 31 has detected a descent of the fire protection door 1. However, the control portion H may perform the retraction control only when the descent detection portion 31 has detected a descent of the fire protection door 1.

(4) Note that the configurations disclosed in the embodiments described above are applicable in combination with configurations disclosed in other embodiments as long as no inconsistency arises. With regard to the other configurations as well, the embodiments disclosed herein are in all respects as illustrative. Therefore, various modifications and alterations may be made as appropriate without departing from the gist of the present disclosure.

Outline of the Embodiment

The following describes an outline of the article transport facility described above.

The article transport facility includes a transport vehicle that travels along a traveling path so as to transport an article, wherein a fire protection door in an open position is present above the traveling path, the fire protection door is capable of moving downward to a closed position located below the open position, the transport vehicle includes: a driving portion that rotates a traveling wheel; a control portion that controls the driving portion; an area detection portion that detects an interference area, which is an area in which a portion of the transport vehicle in the traveling path overlaps a door trajectory, which is a movement trajectory of the fire protection door; and a descent detection portion that detects a descent of the fire protection door, and the control portion performs a retraction control to control the driving portion such that the transport vehicle travels to the outside of the interference area when the descent detection portion has detected a descent of the fire protection door in a state in which the transport vehicle is located in the interference area.

With this configuration, if the transport vehicle is located in the interference area when the descent detection portion has detected a descent of the fire protection door, the transport vehicle travels to the outside of the interference area by the control portion performing the retraction control. Accordingly, it is possible to prevent the fire protection door that has descended from the open position from interfering with the transport vehicle or an article placed on the transport vehicle. Thus, the present configuration can prevent the transport vehicle or an article placed on the transport vehicle from interfering with the fire protection door. Accordingly, it is possible to appropriately allow the fire protection door to descend to the closed position.

Preferably, the article transport facility includes a door detection portion that is disposed below the open position and above the closed position, and detects the fire protection door, wherein the descent detection portion detects a descent of the fire protection door based on a result of detection by the door detection portion.

With this configuration, when the fire protection door starts descending from the open position, the descent detection portion can promptly detect the descent of the fire protection door, and the control portion can promptly perform the retraction control.

Preferably, the article transport facility includes a fire detection device that detects occurrence of a fire, wherein the descent detection portion detects a descent of the fire protection door based on a result of detection by the fire detection device.

Since the fire protection door is closed upon the occurrence of a fire, the descent detection portion can promptly detect a descent of the fire protection door based on a result of detection by the fire detection device, and the control portion can promptly perform the retraction control.

When the article transport facility includes the fire detection device, and the descent detection portion detects a descent of the fire protection door based on a result of detection by the fire detection device, it is preferable that the article transport facility further includes a door movement operation portion that holds the fire protection door so as to be in the open position, wherein the door movement operation portion releases the hold of the fire protection door when the fire detection device has detected a fire.

Preferably, the fire protection door is promptly closed upon the occurrence of a fire. Therefore, it is preferable that the door movement operation portion promptly releases the hold of the fire protection door based on a result of detection by the fire detection device. In this case, the fire protection door is immediately closed upon detection of the occurrence of a fire, and the descent detection portion also promptly detects a descent of the fire protection door based on a result of detection by the fire detection device. Therefore, the control portion can promptly perform the retraction control.

Preferably, the article transport facility further includes a controller that transmits, to the transport vehicle, emergency stop information for stopping the transport vehicle, wherein the control portion functions as the descent detection portion, and the control portion detects a descent of the fire protection door based on the emergency stop information received from the controller.

If the transport vehicle that has been subjected to an emergency stop is located in the interference area, the transport vehicle and the fire protection door will interfere with each other on the occurrence of a situation where the fire protection door subsequently moves to the closed position. Therefore, when emergency stop information is transmitted, it is preferable to determine that the fire protection door is highly likely to descend, and perform the retraction control. By the control portion that performs the retraction control functioning as the descent detection portion, it is possible to promptly detect a descent of the fire protection door based on the emergency stop information, and promptly perform the retraction control.

Here, it is preferable that the controller transmits the emergency stop information, at least, when the door detection portion has detected the fire protection door, and when the fire detection device has detected a fire.

With this configuration, the emergency stop information is transmitted when the fire protection door descends, and, therefore, the descent of the fire protection door is detected appropriately, and the retraction control is performed appropriately. Since the conditions under which the fire protection door descends can be determined by the controller, the program or the like of the controller may simply be updated when setting a condition under which the fire protection door descends in addition to the above-described conditions. That is, it is possible to enhance the function of the article transport facility without updating the program or the like of the control portion of the transport vehicle.

Preferably, the interference area is set in a range in which the area detection portion detects an object to be detected installed along the traveling path, and the object to be detected is installed so as to be detected by the area detection portion in a state in which the whole of the transport vehicle is located in the interference area and a portion of the transport vehicle overlaps the door trajectory.

With this configuration, it is possible to appropriately set the interference area.

Here, it is preferable that the transport vehicle includes: a power receiving portion to which power is supplied from a power feeding line installed along the traveling path; and a power storage device that is charged with the power supplied to the power receiving portion, the control portion performs the retraction control when the supply of power from the power feeding line to the power receiving portion is stopped, in addition to when the descent detection portion has detected a descent of the fire protection door, and the retraction control is performed using the power of the power storage device.

With this configuration, the transport vehicle travels to the outside of the interference area by the control portion performing the retraction control, even when the supply of power from the power feeding line to the power receiving portion is stopped. Accordingly, it is possible to prevent the transport vehicle from stopping in the interference area in a state in which the supply of power to the transport vehicle is interrupted.

What is claimed is:

1. An article transport facility comprising a transport vehicle that travels along a traveling path so as to transport an article, wherein:
a fire protection door in an open position is present above the traveling path,
the fire protection door is capable of moving downward to a closed position located below the open position,
the transport vehicle comprises:
a driving portion that rotates a traveling wheel;
a control portion that controls the driving portion;
an area detection portion that detects an interference area, which is an area in which a portion of the transport vehicle in the traveling path overlaps a door trajectory, which is a movement trajectory of the fire protection door; and
a descent detection portion that detects a descent of the fire protection door, and
wherein the control portion performs a retraction control to control the driving portion such that the transport vehicle travels to the outside of the interference area when the descent detection portion has detected a descent of the fire protection door in a state in which the transport vehicle is located in the interference area.

2. The article transport facility according to claim 1, further comprising a door detection portion that is disposed below the open position and above the closed position, and detects the fire protection door, and
wherein the descent detection portion detects a descent of the fire protection door based on a result of detection by the door detection portion.

3. The article transport facility according to claim 2, further comprising a fire detection device that detects occurrence of a fire, and
wherein the descent detection portion detects a descent of the fire protection door based on a result of detection by the fire detection device.

4. The article transport facility according to claim 3, further comprising a door movement operation portion that holds the fire protection door so as to be in the open position, and
wherein the door movement operation portion releases the hold of the fire protection door when the fire detection device has detected a fire.

5. The article transport facility according to claim 4, further comprising:
a controller that transmits, to the transport vehicle, emergency stop information for stopping the transport vehicle,
wherein the control portion functions as the descent detection portion, and
wherein the control portion detects a descent of the fire protection door based on the emergency stop information received from the controller.

6. The article transport facility according to claim 3, further comprising:
a controller that transmits, to the transport vehicle, emergency stop information for stopping the transport vehicle,
wherein the control portion functions as the descent detection portion, and
wherein the control portion detects a descent of the fire protection door based on the emergency stop information received from the controller.

7. The article transport facility according to claim 2, further comprising:
a controller that transmits, to the transport vehicle, emergency stop information for stopping the transport vehicle,
wherein the control portion functions as the descent detection portion, and
wherein the control portion detects a descent of the fire protection door based on the emergency stop information received from the controller.

8. The article transport facility according to claim 1, further comprising a fire detection device that detects occurrence of a fire, and
wherein the descent detection portion detects a descent of the fire protection door based on a result of detection by the fire detection device.

9. The article transport facility according to claim 8, further comprising a door movement operation portion that holds the fire protection door so as to be in the open position, and
wherein the door movement operation portion releases the hold of the fire protection door when the fire detection device has detected a fire.

10. The article transport facility according to claim 9, further comprising:
a controller that transmits, to the transport vehicle, emergency stop information for stopping the transport vehicle,
wherein the control portion functions as the descent detection portion, and
wherein the control portion detects a descent of the fire protection door based on the emergency stop information received from the controller.

11. The article transport facility according to claim 8, further comprising:
a controller that transmits, to the transport vehicle, emergency stop information for stopping the transport vehicle,
wherein the control portion functions as the descent detection portion, and
wherein the control portion detects a descent of the fire protection door based on the emergency stop information received from the controller.

12. The article transport facility according to claim 1, further comprising:
a controller that transmits, to the transport vehicle, emergency stop information for stopping the transport vehicle,
wherein the control portion functions as the descent detection portion, and
wherein the control portion detects a descent of the fire protection door based on the emergency stop information received from the controller.

13. The article transport facility according to claim 12, further comprising:
a door detection portion that is disposed below the open position and above the closed position, and detects the fire protection door; and a fire detection device that detects occurrence of a fire, and
wherein the controller transmits the emergency stop information at least hen the door detection portion has detected the fire protection door, and when the fire detection device has detected a fire.

14. The article transport facility according to claim 1, wherein the interference area is set in a range in which the area detection portion detects an object to be detected installed along the traveling path, and wherein the object to be detected is installed so as to be detected by the area detection portion in a state in which the whole of the transport vehicle is located in the interference area and a portion of the transport vehicle overlaps the door trajectory.

15. The article transport facility according to claim 1, wherein the transport vehicle comprises:
   a power receiving portion to which power is supplied from a power feeding line installed along the traveling path; and
   a power storage device that is charged with the power supplied to the power receiving portion,
   wherein the control portion performs the retraction control when the supply of power from the power feeding line to the power receiving portion is stopped, in addition to when the descent detection portion has detected a descent of the fire protection door, and
   wherein the retraction control is performed using the power of the power storage device.

16. An article transport facility comprising a transport vehicle that travels along a traveling path so as to transport an article, wherein:
   a fire protection door in an open position is present above the traveling path,
   the fire protection door is capable of moving downward to a closed position located below the open position,
   the transport vehicle comprises:
   a driving portion that rotates a traveling wheel;
   a control portion that controls the driving portion;
   an area detection portion that detects an interference area, which is an area in which a portion of the transport vehicle in the traveling path overlaps a door trajectory, which is a movement trajectory of the fire protection door;
   a descent detection portion that detects a descent of the fire protection door; and
   an object to be detected installed along the traveling path continuously to correspond to the interference area,
   wherein the object to be detected is installed along the traveling path so that the object to be detected is detected by the area detection portion when a portion of the transport vehicle is in a state of overlapping the door trajectory, and the object to be detected is not detected by the area detection portion when the whole of the transport vehicle is in a state of not overlapping the door trajectory, and
   wherein the control portion performs a retraction control to control the driving portion such that the transport vehicle travels to the outside of the interference area when the descent detection portion has detected a descent of the fire protection door in a state in which the transport vehicle is located in the interference area based on the detection result of the object to be detected by the area detection portion.

* * * * *

UNITED STATES PATENT AND TRADEMARK OFFICE
CERTIFICATE OF CORRECTION

PATENT NO. : 11,059,672 B2
APPLICATION NO. : 16/117366
DATED : July 13, 2021
INVENTOR(S) : Ogawa et al.

Page 1 of 1

It is certified that error appears in the above-identified patent and that said Letters Patent is hereby corrected as shown below:

In the Claims

Column 10, Line 61, Claim 13, delete "hen" and insert -- when --

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*